United States Patent [19]
Cichanski

[11] Patent Number: 4,781,067
[45] Date of Patent: Nov. 1, 1988

[54] BALANCED SCANNING MECHANISM
[75] Inventor: Frank J. Cichanski, Elgin, Ill.
[73] Assignee: Sonoscan, Inc., Bensenville, Ill.
[21] Appl. No.: 44,419
[22] Filed: Apr. 30, 1987
[51] Int. Cl.⁴ .............................................. G01N 29/04
[52] U.S. Cl. ........................................ 73/620; 73/633; 250/363 S
[58] Field of Search ................. 73/620, 621, 627, 629, 73/633, 606, 607, 618; 367/104; 324/262; 250/234, 235, 363 SC, 363 SF; 378/146; 358/293

[56] References Cited
U.S. PATENT DOCUMENTS

| 3,870,886 | 3/1975 | Casale | 250/367 |
|---|---|---|---|
| 3,910,124 | 10/1975 | Halsey | 73/618 |
| 4,021,771 | 5/1977 | Collins et al. | 367/104 |
| 4,030,342 | 6/1977 | Bond et al. | 73/620 |
| 4,253,027 | 2/1981 | Taylor et al. | 378/14 |
| 4,255,971 | 3/1981 | Rosencwaig | 73/606 |
| 4,446,738 | 5/1984 | Ishikawa et al. | 73/606 |

Primary Examiner—John Chapman
Attorney, Agent, or Firm—Kinzer, Plyer, Dorn, McEachran & Jambor

[57] ABSTRACT

A balanced scanning mechanism for driving the transducer of an acoustic microscope or other instrument rapidly back and forth along a linear path comprising the X portion of an X-Y scan pattern comprises first and second carriages guided for movement along an axis X. The transducer is mounted on the first carriage and a counterweight may be mounted on the second carriage; the total mass of each carriage and its contents is equal to that of the other carriage. Drive belts connected to both carriages drive them reciprocally along the X axis with accelerations and velocities that are equal in amplitude but opposite in direction. In some embodiments the two carriages are nested one within the other. In another embodiment the two carriages are mounted closely adjacent to each other on an elongated, rigid guide rail parallel to the X axis, the mass distributions of the two carriages being matched relative to the guide rail.

18 Claims, 3 Drawing Sheets

BALANCED SCANNING MECHANISM

BACKGROUND OF THE INVENTION

This invention relates to a scanning mechanism for rapid back-and-forth mechanical scanning of an ultrasonic transducer or other like device in sensing, measuring, or analyzing a specimen or target. A "scanning mechanism" is a mechanical conveyance which moves either a specimen or a transducer back and forth along a line or in a raster of lines or other scanning pattern; it may also make adjustments in a third (focal) dimension. The transducer may be any of several kinds, including devices that emit or receive light or other electromagnetic waves or particles such as neutrons, positrons, or others, or streams of fluids, or aerosols, or sound waves, or magnetic or electric fields, or other media by which a target is examined or affected. This invention is particularly applicable to an ultrasonic transducer or transducer pair used for forming an image in an ultrasound C-SCAN inspection system, e.g., an acoustic microscope, and is described in that connection.

In a C-SCAN system a transducer bombards a target with acoustic energy, usually in a focused field. That same transducer, or another transducer, receives transmitted, refracted, or reflected signal energy from the target; that signal is then further processed electronically to extract information about phase, amplitude, time of flight, and/or other signal content. Typically, the emitted acoustic energy is a discrete pulse and the transducer is a highly focussed device; this requires maintenance of high positional accuracy and stability so that coherence of the signal with respect to the target zone examined and its relation in time can be kept valid. Acoustical frequencies used are usually in the range of one to one thousand megahertz; at the medium and higher frequencies, high resolution detail can be obtained, though limited in part by the positional accuracy of the scanning mechanism. Scanning is usually effected by moving the instrument head rather than the target, at least for the largest scan dimension, and thousands of pixels (picture elements) are derived for subsequent storage or display. To complete the scan in a reasonable time, the mechanical motion must be rapid; for the information to be valid, the scan must be quite accurate positionally.

To appreciate the requirement for scanning speed, a typical example can be considered: a reasonable target display might consist of 256×256=65,536 pixels. At the rate of one pixel per second, one scan would require over 18 hours. More practically, the rate must be of the order of ten thousand pixels/second. Conversely, to appreciate the requirement for positional accuracy, consider that detail of a fraction of a thousandth of an inch may be required. Any positional error of this magnitude may eradicate the required detail.

The requirements for speed and accuracy are generally antagonistic. In the typical C-SCAN machine, a raster or parallel set of lines is usually the pattern of choice, since it allows easy, direct mapping of the target. Such a pattern requires rapid back and forth acceleration of the scan mechanism and rapid motion (often a step function) in a second dimension; there is also a possible requirement for rapid, accurate motion in a third (focal) dimension. For these rapid accelerations, fairly massive objects must be impelled with substantial force. Their motions, and their reactive forces against their drive mechanisms, cause both simple and complex positional errors. Thus, reaction may cause complementary accelerations between various parts of the system, effectively shifting either the transducer or the target to an erroneous position. Stresses may distort the mechanism, redirecting the motional vectors so that positional errors appear in unexpected directions. Rotational moments of inertia may create similar errors.

The ultimate scanning speed limit for a C-SCAN type system is often determined independently of the scanning mechanism. The speed of the scanning mechanism should approach this ultimate limit as closely as practical to maximize system throughput. In one version of a reflection-mode acoustical microscope, discrete pulses sent through a coupling medium such as water (acoustic velocity 1480 meters/second) and then through a target of some solid such as aluminum (6200 m/second) traverse a total path length of about one-half inch (1.27 cm) through each medium in the round trip. This requires a round trip time-of-flight just under eleven microseconds. In such a system the scanning mechanism should scan new target areas at the rate of one pixel width each eleven microseconds.

Of course, time spent in acceleration and deceleration detracts from the maximum theoretically possible scan rate. Speeds should theoretically be linear throughout each scan line, with an abrupt reversal at an essentially infinite rate of acceleration at each scan line end. To achieve this in actuality is plainly impossible. However, maximization of the time the scanning mechanism is moving near its peak rate, and minimization of times required for reversal, are reasonable goals.

As the demand for scanning speed increases, accelerations are perforce limited to preclude positional errors of confounding magnitude. The compromise optimum is a sinusoidal plot of velocity, with velocity at a maximum only at the precise middle of the scan; at other times velocity changes at the maximum permissible rate. Extreme rigidity and massiveness of the scanning mechanism may be required, these requirements increasing with speed. The transducer mass becomes critical, and must be minimized so that its inertia is minimal compared with the machine as a whole.

SUMMARY OF THE INVENTION

It is an object of this invention, therefore, to provide a new and improved compact scanning mechanism for an acoustic microscope or other scanning instrument that effectively balances local momenta and inertia forces, both translational and rotational, so that the scanning mechanism operates accurately and efficiently at high scanning rates.

Another object of the invention is to provide a new and improved C-SCAN mechanism for an acoustic microscope or other scanning instrument that is adapted for use with a moving transducer of substantial size and weight but that nevertheless provides accurate and efficient scanning at high speeds.

Accordingly, in one aspect the invention relates to a balanced, null-inertia X axis scanning mechanism for an acoustic microscope or other instrument of the kind comprising a transducer and a scanning mechanism for moving the transducer back and forth relative to a specimen along an axis X and shifting the specimen and transducer relative to each other along a transverse axis Y so that the specimen is scanned in a predetermined X-Y raster; the scanning mechanism comprises a first carriage and a second carriage, guide means for guiding the carriages for movement along the axis X, and a transducer mounted on the first carriage. The total mass of the second carriage is equal to the total mass of the transducer and the first carriage, and the distribution of each of those total masses is balanced with respect to the X axis. Drive means comprising two elongated linear drive elements located on opposite sides of the X axis and each, connected to both carriages, drives the carriages reciprocally along the axis X, with accelerations and velocities which are equal in amplitude but opposite in direction. The drive means is approximately symmetrical with respect to the X axis so that driving forces applied to the carriages are effectively balanced about the X axis and so that a straight line between the centers of carriage mass and the line of carriage motion both correspond approximately to the X axis.

In another aspect the invention relates to a balanced-inertia X axis scanning mechanism for an acoustic microscope or other instrument of the kind comprising a transducer and a scanning mechanism for moving the transducer back and forth relative to a specimen along an axis X and for shifting the specimen and transducer relative to each other along a transverse axis Y so that the specimen is scanned in a predetermined X-Y raster; the scanning mechanism comprises an elongated, rigid guide rail extending parallel to the axis X, first and second carriages, mounted adjacent to each other on the guide rail for reciprocal movement therealong, each carriage being of substantially C-shaped configuration, with two legs of the carriage extending across and engaging opposite sides of the guide rail, and a transducer mounted on the first carriage. The total mass of the second carriage is equal to the total mass of the transducer and the first carriage, and the distribution of each of those total masses is balanced with respect to the X axis. Drive means, connected to both carriages, and substantially symmetrical with respect to the X axis, drives the carriages reciprocally along the axis X, with accelerations and velocities which are equal in amplitude but opposite in direction.

DESCRIPTION OF THE PREFERRED EMBODIMENTS

Figure 1:
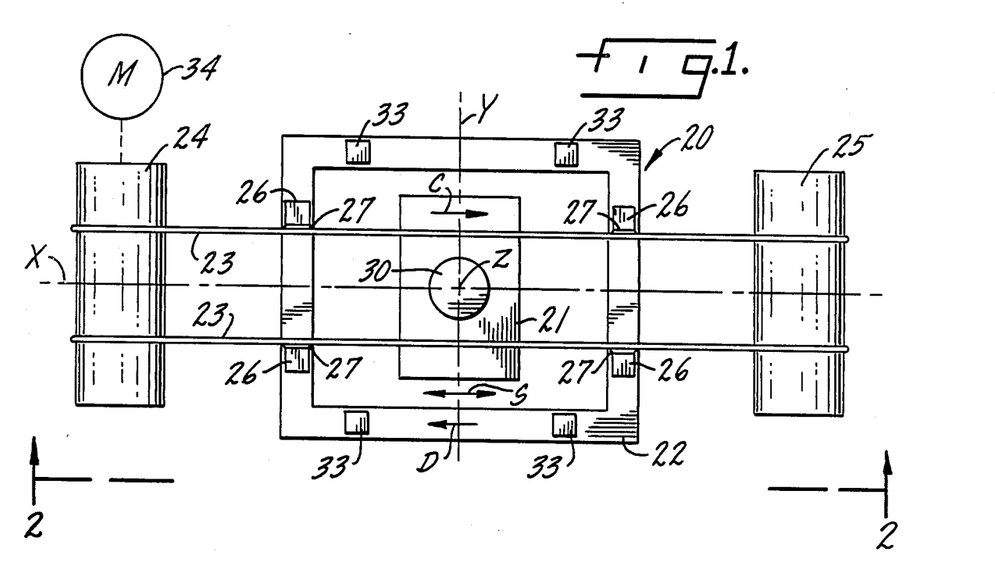
FIG. 1 is a schematic plan view of a scanning mechanism for an acoustic microscope constructed in accordance with one embodiment of the present invention.
Figure 2:
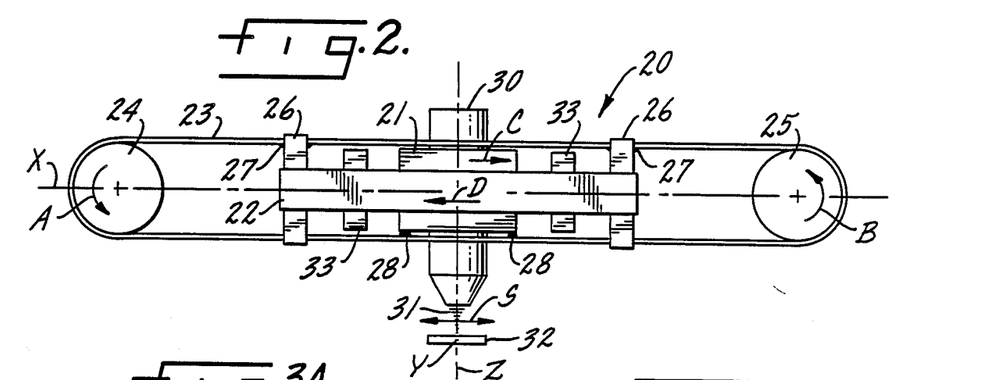
FIG. 2 is an elevation view taken approximately as indicated by line 2—2 in FIG. 1.

FIGS. 1 and 2 illustrate a balanced, null-inertia scanning mechanism 20, constructed in accordance with one embodiment of the present invention, which may be utilized in an acoustic microscope or other instrument of the kind comprising a transducer and a scanning mechanism for moving the transducer back and forth relative to a specimen along an axis X, while shifting the specimen or the transducer along a transverse axis Y, so that the specimen is scanned in a predetermined X-Y raster. Scanning mechanism 20 comprises a first carriage 21 and a second carriage 22. As illustrated in FIGS. 1 and 2, each of the two carriages is essentially rectangular in configuration and the second carriage 22 is disposed in encompassing relation to the first carriage 21.

Scanning mechanism 20 includes guide means for guiding carriages 21 and 22 for movement along the axis X. This guide means includes a pair of non-elastic endless drive belts or wires 23 that extend around two rollers 24 and 25 located at opposite sides of the scanning mechanism; rollers 24 and 25 have axes that are parallel to the Y axis and normal to the X axis. One run of each of the two drive belts 23 is affixed to upwardly projecting elements 26 that are a part of the second carriage 22, as indicated by the welds or other connections 27. The other run of each of the drive and guide belts 23 is also affixed to the bottom of carriage 21 as indicated by the welds or other fastening means 28.

Scanning mechanism 20 further comprises a transducer 30 that is mounted on the first carriage 21, preferably in the center of the carriage. In a typical acoustic microscope, transducer 30 emits individual pulses 31 of ultrasonic energy that impinge upon a specimen 32 as shown in FIG. 2. Transducer 30 preferably hss a fixed focal length for the emitted ultrasonic energy pulses 31. The focal point for pulse beam 31 may be shifted upwardly or downwardly, relative to specimen 32, by adjustment of the position of scanning mechanism 20 along a vertical axis Z.

The total mass of the first carriage 21 and its transducer 30 are made equal to the total mass of the second carriage 22, which may include a plurality of individual counterweights 33. If transducer 30 is changed and the replacement transducer has a different mass, the relationship of equalized masses between carriages 21 and 22 may be maintained by changing counterweights 33. Of course, it will be recognized that this counterweight arrangement can be reversed. That is, the weight of carriage 22 may be made to exceed that of the total weight of carriage 21 and the heaviest transducer, with counterweights mounted on carriage 21 to achieve the necessary mass balance.

Scanning mechanism 20 has a drive means that includes a motor 34 connected in driving relationship to roller 24. The drive means also includes belts 23 and roller 25, these elements serving both to drive and to guide the movements of carriages 21 and 22.

In FIGS. 1 and 2, carriages 21 and 22 are shown at starting position centered on the juncture of the three axes a X, Y and Z. From this position, with motor 34 driving roller 24 in the direction of the arrow A (FIG. 2), belts 23 move the first carriage 21 and transducer 30 to the right as indicated by arrow C in each of FIGS. 1 and 2. Of course, this same movement of wires or belts 23 rotates roller 25 in the direction of arrow B so that carriage 22 is driven in the direction of arrow D, opposite to arrow C. Furthermore, the acceleration and velocity for each carriage always matches that of the other, though the directions are reversed.

Figure 3A:
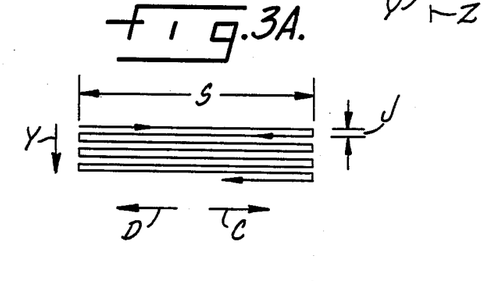
FIG. 3A illustrates a typical C-scan scanning pattern, on a scale larger than FIGS. 1 and 2.

The overall travel permitted for carriage 21 and transducer 30 is limited by the size of carriage 21 and the space within the interior of carriage 22. For the illustrated embodiment, the travel distance employed may be as indicated in FIGS. 1 and 2 by vector S, indicating the limits of movement of carriage 21 in opposed directions. The overall C-scan raster is as illustrated in FIG. 3A, with specimen 32 moving forward in short increments J along the Y axis. The velocity relationships for carriages 21 and 22 are shown in FIG. 3B; the acceleration relationships would be the same.

Figure 3B:
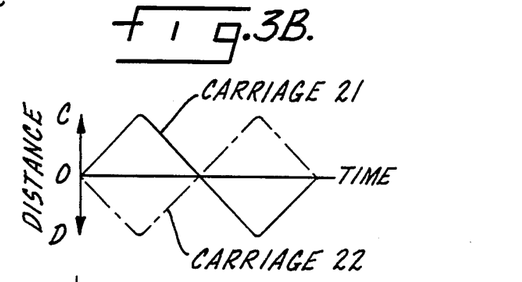
FIG. 3B illustrates the velocity/acceleration relationship for two carriages in FIGS. 1 and 2.

As indicated by the scanning pattern illustrated in FIG. 3A, each time the first or transducer carriage 21 reaches the limit of its movement in the direction of arrow C, as determined by scan distance S, its velocity reaches zero (FIG. 3B). At this point, motor 34 is reversed and drives roller 24 to rotate in a direction opposite arrow A. The resulting movement of drive/guide belts 23 along the bottom of mechanism 20 drives the first carriage 21 in the direction of arrow D; conversely, the top run of wires 23 causes the second or counterweight carriage 22 to move in the direction of arrow C. As before, the accelerations and velocities of the two carriages are equal at all times but opposite in direction. The end result is the C-scan pattern shown in FIG. 3A.

Scanning mechanism 20 is a balanced, null-inertia system in which the counter mass of the second carriage 22 is equal to the total mass of carriage 21 and its transducer 30, both masses moving equal distances at equal speeds collinearly along axis X. All momenta of translation cancel each other at all times. With movement of the two carriages constrained to directions parallel to axis X, it is not necessary for the carriage masses to be completely symmetrical with respect to that axis; however, they should be balanced, as regards the X axis, in both the Y and Z directions. That is, there should be as much mass above the X axis as below it, for each carriage, and lateral displacement of the carriage mass, in each instance, should be equalized with respect to the X axis. Within those constraints the carriage velocities and accelerations may be increased substantially as compared with conventional scan mechanisms. Indeed, with this balanced, null-inertia construction the more critical limitations on scanning velocities are now most likely to result from external factors such as the acoustic path time for scanning pulses 31, limitations of motor 34, strength of drive components such as belts 23, or even the modulus of elasticity of the materials used in constructing elements of the scanning mechanism, which may become a source of position error due to shear and compression forces on the apparatus.

There is one respect in which scanning mechanism 20 is not fully compensated with respect to inertial and momentum forces. Drive roller 24 and guide roller 25 rotate in the same direction at any given time (see arrows A and B). Thus, the momenta for rollers 24 and 25 are parallel and additive rather than cancelling in nature. In most scanning mechanisms this can be tolerated; in other applications it may place an undue limitation upon the scanning speed. This problem is effectively eliminated by the scanning mechanism 40 of FIGS. 4 and 5.

Figure 4:
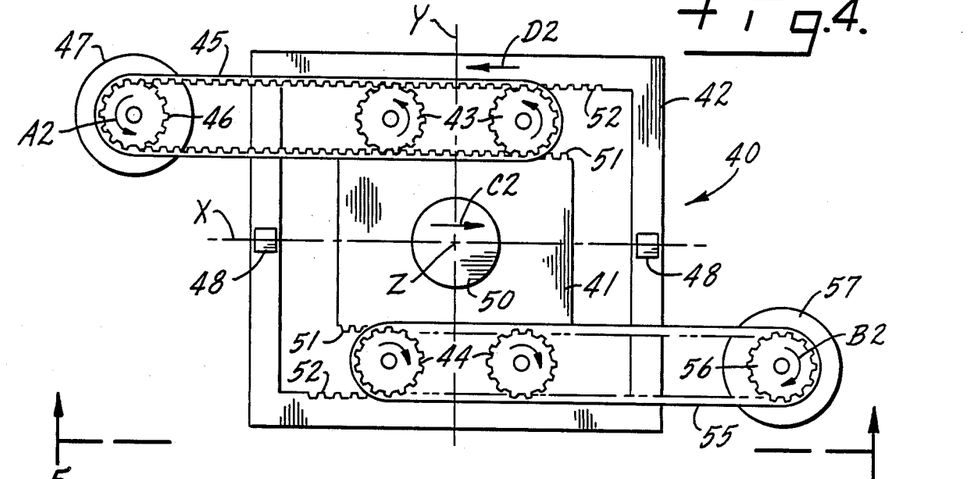
FIG. 4 is a schematic plan view of a scanning mechanism constructed in accordance with another embodiment of the invention.
Figure 5:
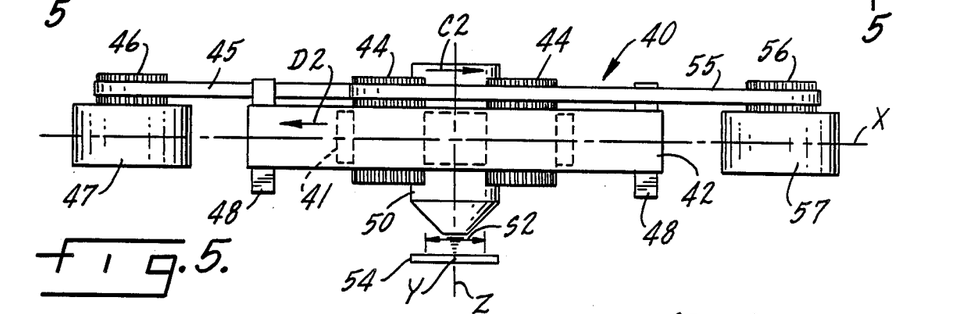
FIG. 5 is a elevation view taken approximately along line 5—5 in FIG. 4.

Scanning mechanism 40 comprises a first carriage 41 and a second carriage 42. Carriages 41 and 42 are both of rectangular configuration; carriage 42 is disposed in encompassing relationship to carriage 41. The inner surfaces 52 of the sides of carriage 42 parallel to the axis X for scanning mechanism 40 constitute drive surfaces; friction drive surfaces could be employed but it is preferable that drive surfaces 52 comprise gear racks or the like. The gear rack drive surfaces 52 are engaged by two rotary driving members, shown as pinion gears 43 on one side of axis X and two similar pinion gears 44 on the opposite side of the X axis. Similarly, the surfaces 51 of carriage 41 parallel to the X axis constitute drive surfaces, in this instance gear racks, which are also engaged by pinion gears 43 and 44. Pinion gears 43 and 44 afford an effective guide means for guiding movement of carriages 41 and 42 along the X axis.

Pinions 43 are engaged by an inelastic primary drive belt 45 that also engages a pinion 46 on the operating shaft of an X-axis drive motor 47. In a similar arrangement, pinions 44 are engaged by an inelastic secondary drive belt 55 that further engages a pinion 56 on a counter rotor 57. While member 57 may constitute merely a drone rotor, other arrangements may be employed. For example, counter rotor 57 may also incorporate the function of a position sensor for use in control of scanning mechanism 40, a particularly useful arrangement when there is a necessity to vary the overall scan line length S2 (FIG. 5). On the other hand, counter rotor 57 may be a second motor essentially identical to motor 47, the two motors being operated in reverse-series relationship.

A transducer 50 is mounted on carriage 41, preferably in the center of the carriage so that the transducer is accurately aligned with the intersection of axes X, Y and Z as shown in FIGS. 4 and 5. The total mass of the second or counterweight carriage 42 is made equal to the total mass of transducer 50 and its carriage, the first carriage 41. To this end, appropriate counterweights 48 may be mounted on carriage 42. Alternatively, variable counterweights may be mounted upon the first carriage 41 for the same purpose. In any event, the mass for each of carriages 41 and 42 should be balanced with respect to the X axis, as shown in FIGS. 4 and 5, preferably in both the Y and Z directions.

In considering the operation of scanning mechanism 40, it may first be assumed that motor 47 is energized to rotate its shaft and pinion 46 in a counterclockwise direction as indicated by arrow A2. As a consequence, pinions 43 are both rotated counterclockwise, driving transducer carriage 41 in the direction of arrow C2 and driving counterweight carriage 42 in the direction of arrow D2. As before, the directions of movement of carriages 41 and 42 are precisely opposite to each other, both moving parallel to axis X. The direct coupling of both carriages to motor 47, with the same drive ratio, through rotary drive members 43, 44 and drive surfaces 51, 52 assures that the accelerations and velocities for both carriages are always equal, though opposed in direction.

At the other side of the X axis, with motor 47 rotating counterclockwise as described, the movement of first carriage 41 in the direction of arrow C2 drives both of the pinions 44 into clockwise rotation. Consequently, due to the drive connection afforded by belt 55, pinion 56 and counter rotor 57 are rotated clockwise as indicated by arrow B2.

The scanning action of mechanism 40 may be the same as for the previously described mechanism 20 and conforms to that illustrated in FIGS. 3A and 3B. In each cycle of operation, the first carriage 41 bearing transducer 50 moves first in one direction (e.g. arrow C2) until it reaches the end of a predetermined scan path S2. At that point, the direction of movement of carriage 41 is reversed (e.g. to arrow D2) and carriage 41 is driven a full scan distance S2 back in the opposite direction along axis X. This action is continued until a target 54 has been scanned, target 54 being advanced an incremental distance J (FIG. 3A) for each scan line. In scanning mechanism 40, as in the previously described mechanism 20, all translational inertia and momenta are effectively nullified by the balanced arrangement employed. In mechanism 40, in addition, all rotary moments for the complete mechanism, including motor 47 and counter rotor 57, are also balanced to a null condition.

Figure 3C:
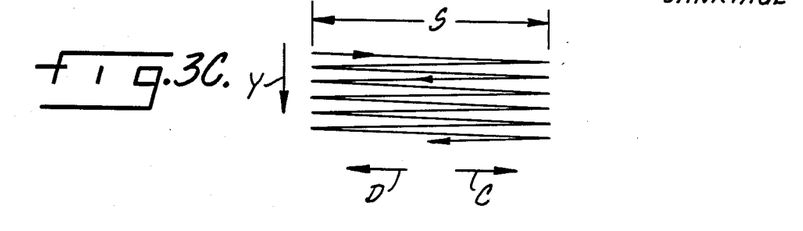
FIG. 3C corresponds to FIG. 3A but shows a different scan pattern.

It will be recognized that other modifications can be made in scanning mechanism 40 without changing the overall balance and null-inertia characteristics of the mechanism. For example, one of the pinions 43 could be mounted directly on the shaft of motor 47, eliminating drive belt 45. If this is done, the counter rotor 57 should be mounted upon the shaft of the corresponding pinion 44 on the opposite side of the mechanism, with belt 55 also eliminated; to maintain symmetry and balance in the scanning mechanism. Of course, it may be desirable to mount specimen 54 on a platform movable along axis Z for focusing purposes, or the entire scanning mechanism 40 may be made movable along axis Z for this purpose. By the same token, while the foregoing description assumes that specimen 54 is jogged forward in the direction of the Y axis, movement of mechanism 40 parallel to the Y axis may be provided instead. For both of scanning mechanisms 20 and 40, the relative movement of the target in the Y direction may be continuous in which case a different scanning pattern is produced, as illustrated in FIG. 3C.

There is one respect in which scanning mechanism 40, as illustrated, is not absolutely balanced; only one set of primary and secondary drive belts 45 and 55, located above carriages 41 and 42, have been shown. This may be modified by adding pinions below motor 47 and counter rotor 57, extending pinions 43 and 44 below carriage 42, and adding two drive belts complementary to belts 45 and 55.

Figure 6:
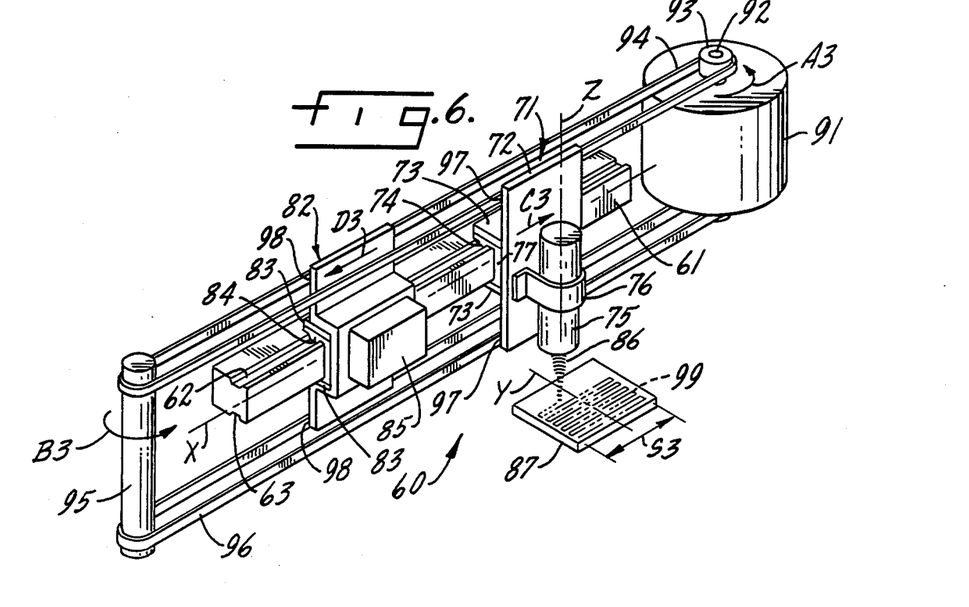
FIG. 6 is a simplified schematic perspective view of a balanced-inertia scanning mechanism for an acoustic microscope constructed in accordance with a further embodiment of the present invention.

FIG. 6 affords a simplified, somewhat schematic perspective illustration of a balanced-inertia scanning mechanism 60 for an acoustic microscope or other instrument comprising another embodiment of the invention. Scanning mechanism 60 includes an elongated rigid guide rail 61 extending parallel to an axis X that constitutes the principal scanning axis for mechanism 60. Rail 61 has two guide slots 62 and 63 in its upper and lower surfaces, respectively, the guide slots also extending parallel to axis X.

Scanning mechanism 60 further comprises a first carriage 71 of generally C-shaped configuration, as regards guide rail 61. Thus, carriage 71 includes a transducer support plate 72 to which two legs 73 are affixed. The carriage legs 73 extend across and engage opposed sides (top and bottom) of guide rail 61. Legs 73 include guide projections 74 that project into the guide slots 62 and 63 of rail 61. A transducer 75 is removably mounted upon plate 72 by suitable means such as a bracket 76. In the illustrated construction, the scanning axis X extends through a vertical leg 77 of transducer carriage 71.

Scanning system 60 further comprises a second carriage 82 having a C-shaped central portion. Two carriage legs 83 are disposed in partially encompassing relation to guide rail 61, projecting across the top and bottom of the guide rail. Each leg 83 includes a guide projection 84 that is engaged in one of the two guide slots 62 and 63 in rail 61. A countermass 85 is removably mounted upon the second carriage 82 of scanning mechanism 60 by appropriate means (not shown in FIG. 5). Counterweight 85 is selected so that the total mass of the second carriage 82, including the countermass, is equal to the total mass of the first carriage 71, including transducer 75. Furthermore, the distribution of the overall weight of carriage 71 and transducer 75 is such that it is essentially balanced with respect to the X axis. The same is true of the total mass of carriage 82 and counterweight 85.

Assuming that scanning mechanism 60 (FIG. 6) is utilized in an acoustic microscope, transducer 75 generates a succession of focused ultrasonic pulses generally represented at 86 and these pulses impinge upon a specimen or target 87. Target 87 is mounted upon a suitable motion bed (not shown) to move the target in the direction of a secondary scanning axis Y. The entire scanning mechanism 60 is preferably mounted upon a vertical motion guide of the kind described hereinafter to permit limited motion along a third axis for focusing purposes, in this instance the vertical axis Z.

The drive means for scanning mechanism 60 includes an electric drive motor 91 having a shaft 92 that projects out of the motor housing at both ends of the motor, top and bottom. At the top end, shaft 92 carries a pinion 93 that is engaged by an inelastic drive belt 94. Belt 94 extends across mechanism 60, parallel to axis X, and has its opposite end engaged with an idler 95. A second drive belt 96, similar in all respects to belt 94, is driven by the lower end of shaft 92 (not shown). Like belt 94, belt 96 extends parallel to axis X and engages idler 95. For each drive belt, the front or outer run of the belt is affixed to plate 72 of carriage 71 as generally indicated at points 97. The other or rear run of each of belts 94 and 96 is secured to carriage 82 as generally indicated by reference numerals 98.

In considering operation of scanning mechanism 60, FIG. 6, it may be assumed that motor 91 is rotating its shaft 92 and pinion 93 in the direction indicated by arrow A3. Of course, this causes idler 95 to be rotated in the direction of arrow B3 due to movement of drive belts 94 and 96. Because transducer carriage 71 is affixed to belts 94 and 96 at points 97, carriage 71 and its transducer 75 are driven in the direction indicated by arrow C3. Conversely, because the second or counterweight carriage 82 is secured to belts 94 and 96 at points 98, the second carriage is driven in the direction indicated by arrow D3. Of course, arrows C3 and D3 are parallel to axis X because the two carriages can only move along a path, determined by guide rail 61, that is centered on the X axis.

When transducer 75 reaches the end of its motion in direction C3 along axis X, motor 91 is reversed to drive the two carriages back in the opposite directions. That is, in the next scanning line motor 91 and idler 95 rotate in the opposite directions to arrows A3 and B3, the first carriage 71 with its transducer 75 is driven in the direction D3 and the second carriage 82 is driven in the direction C3. As in the previous embodiments, the directions of movement for arriages 71 and 82 are always opposite to each other but the accelerations and velocities imparted to the two carriages by the drive means are always equal. The result is the scanning pattern indicated by phantom line 99 on target 87, the target being advanced intermittently along axis Y to generate the scanning pattern of FIG. 3A or being advanced continuously to carry out the scan pattern of FIG. 3C.

Figures 7, 8:
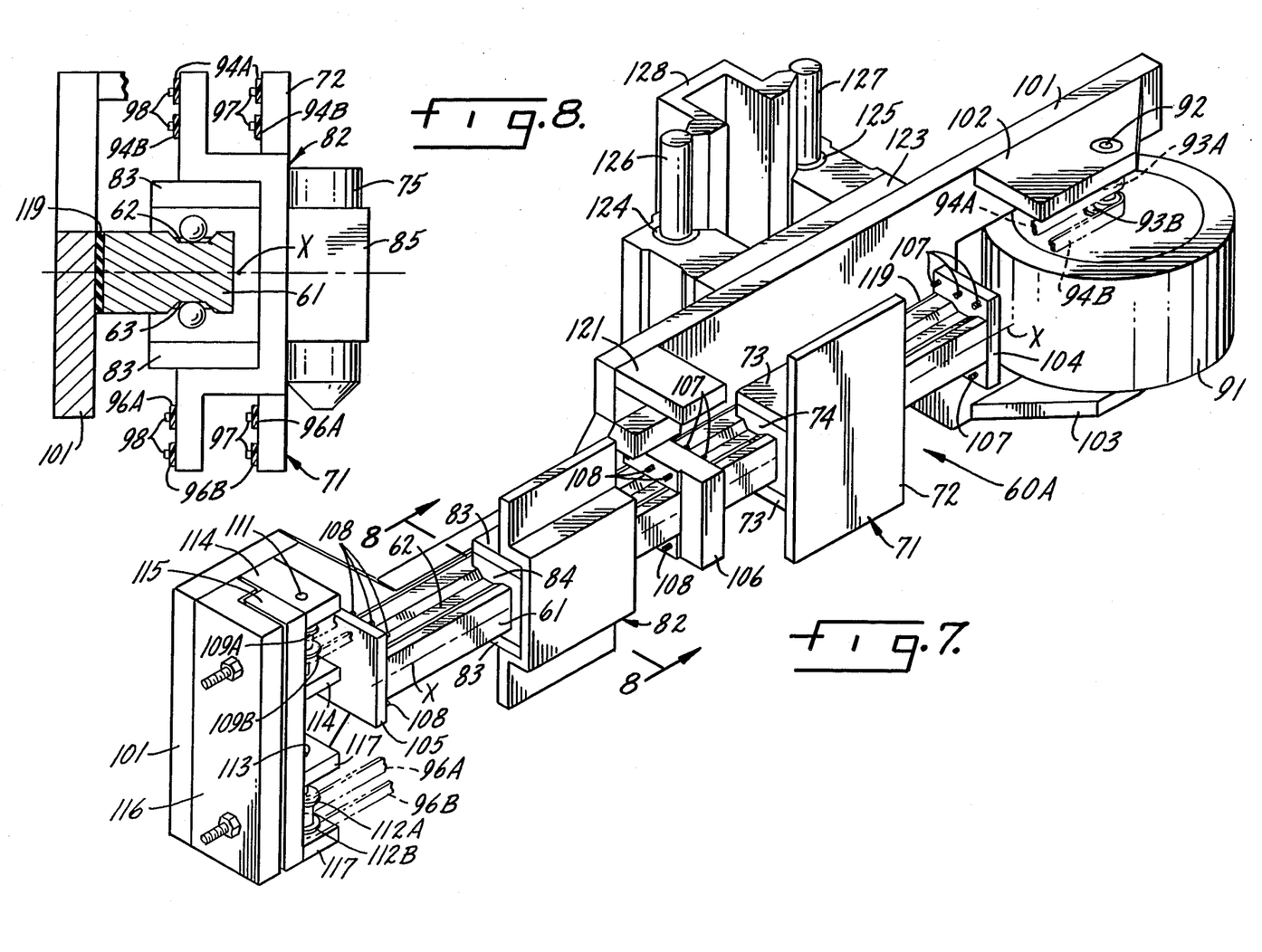
FIG. 7 is an enlarged view of the mechanism of FIG. 6, showing the scanning device in greater detail.
FIG. 8 is a detail sectional view taken approximately along line 8—8 in FIG. 7.

FIGS. 7 and 8 afford a more detailed illustration of a practical embodiment 60A of the scanning mechanism 60 of FIG. 6. In FIG. 7, the drive belts, the transducer, and the counterweight have been omitted in order to illustrate other components more fully. However, these components do appear in FIG. 8.

The scanning mechanism 60A of FIGS. 7 and 8 includes a heavy, rigid, elongated base plate 101 that constitutes the principal support for most of the components of the scanning mechanism. At the right hand end of base plate 101, as seen in FIG. 7, two motor bearing plates 102 and 103 are affixed to the base plate. Bearing plates 102 and 103 afford the necessary support for motor 91, which is mounted between them. The motor shaft 92 can be seen at the top right of FIG. 7 and two of four pinions or drive sprockets 93A and 93B are shown mounted on the motor shaft. There is a similar pair of sprockets on the lower part of shaft 92, which cannot be seen in FIG. 7.

Guide rail 61 is mounted on base plate 101 and extends for most of the length of the base plate, apart from the portion of the base plate that holds motor 91. An elastomer pad 119 may be interposed between rail 61 and base plate 101 for shock isolation. A first end stop plate 104 is mounted on base plate 101 at the right hand end of rail 61. A similar end stop plate 105 is mounted upon base plate 101 at the other end of guide rail 61. A C-shaped middle stop member 106 affixed to base plate 101 fits over the central portion of guide rail 61 and separates the guide rail into two segments, one for each of the carriages 71 and 82. Member 106 thus affords a barrier between the two carriages.

A series of springs 107 are mounted upon plate 104, aligned with and facing toward the horizontal legs 73 of transducer carriage 71. A similar set of springs 107 are mounted upon stop plate 106 in position to engage the opposite side of each of legs 73 of carriage 71. On the left-hand side of the mid-stop plate 106, there are a series of springs 108 positioned to engage one side of each of the legs 83 of countermass carriage 82. On the other end stop plate 105 there are a plurality of additional springs 108 positioned to engage the opposite sides of legs 83 of carriage 82.

In scanning mechanism 60A, the upper drive belt 94 of the prototype shown in FIG. 6 is afforded by two drive belts 94A and 94B, shown in phantom in FIG. 7, which engage the sprockets or pinions 93A and 93B respectively. At the opposite end of mechanism 60A, these same drive belts engage two sprockets 109A and and 109B mounted on a shaft 111. The paired drive belts 94A and 94B are also shown in FIG. 8, which illustrates more clearly their relationship to and connections with carriages 71 and 82. Similarly, in the embodiment of FIGS. 7 and 8 the lower drive belt is provided by two separate belts 96A and 96B which engage two sprockets 112A and 112B mounted upon a shaft 113. Again, FIG. 8 shows the relationship between belts 96A and 96B and their fastening to the two carriages 71 and 82, as by fasteners 97 and 98.

Shaft 111 is journalled in bearings mounted in two plates 114 that are affixed to a left axis mounting plate 115 that in turn is secured to a left axis tension bracket 116. Similarly, shaft 113, which is axially aligned with shaft 111, extends between two mounting plates 117.

Shafts 111 and 113 could be a single continuous shaft if desired; they serve the function of the idler 95 in the construction shown in FIG. 6.

Scanning mechanism 60A, FIGS. 7 and 8, functions in precisely the same manner as the prototype mechanism 60 shown in FIG. 6. Motor 91 drives belts 94A, 94B, and 96A, 96B first in one direction and then the other. This drives transducer carriage 71 and countermass carriage 82 in opposite directions along guide rail 61, along axis X. As in all previous embodiments, the two carriages are always driven at the same velocity and with the same acceleration, but in opposite directions. Springs 107 and 108 function as emergency limiting devices; ordinarily, the travel of each of the carriages 71 and 82 is interrupted before they impinge upon the springs. Thus, the springs are there only to prevent damage to the mechanism. The extent of travel for the two carriages along axis X may be adjusted to suit the requirements of individual targets, using appropriate controls for motor 91. If desired, a position sensor scale may be mounted between a support post 121 affixed to base plate 101 and motor bearing plate 102, with the scale scanned by a sensor mounted on plate 72 of carriage 71 to obtain appropriate signals determinative of the position of carriage 71. The position signals may then be used to control motor 91. This is the same kind of positioning, acceleration, and velocity control as has been used frequently in the past in printer carriage controls and like applications and hence need not be described in detail.

Base member 101, on which all of scanning mechanism 60A as thus far described is mounted, may be secured by appropriate means to a vertical carriage 123 provided with two vertical guideways 124 and 125. Guideways 124 and 125 engage a pair of vertical guide rails 126 and 127 interconnected by a yoke 128. This affords a simple yet effective guide arrangement for Z-axis movements of mechanism 60A; it is utilized in adjusting the focus of transducer 75.

In scanning mechanisms constructed in accordance with the present invention, the scanning distance S along the X axis may vary to a substantial extent, depending upon the size and nature of the targets under examination. In an acoustic microscope, typically, the scan line length S may vary from 0.051 inch (0.13 cm) or even less to 3.5 inch (9 cm) or more. A typical increment J of jogging movement in the Y direction would be 0.0002 inches, though this also is subject to appreciable variation. The time allotted for traversing a complete line of the scanning raster may typically be about 0.04 seconds, again subject to substantial variation depending upon the type of instrument in which the scanning system is employed and other system requirements.

As will be apparent from the foregoing descriptions, drive belts or other drive members used in various embodiments of the invention should be essentially inelastic to preclude unacceptable position errors. That is, appreciable distortion in a longitudinal direction, on the part of the drive belts, creates position errors that are generally intolerable. In some instances wire-like drive elements may be employed. Non-elastic belts of a conventional timing belt configuration can be utilized. For the mechanism 60A of FIGS. 7 and 8, the preferred construction for drive belts 94A, 94B, and 96A, 96B are ladder-type resin belts that are similar to conventional cycle chains but that are made primarily of resin materials. In that same embodiment, the drive motor may typically be a commercially available pancake type servo-motor with high torque, low inertia characteristics.

In an acoustic microscope, in which target specimens are usually immersed in or at least coupled to an aqueous medium, and in which the ultrasonic energy output from the transducer and other factors may lead to the presence of appreciable aqueous vapor it is highly desirable that all of the metal components of the scanning mechanism be formed of stainless steel, aluminum or other metals not readily susceptible to corrosion. This is another reason that plastic drive belts are preferred.

In all embodiments of the invention, as previously noted, the total mass of each carriage and its contents must be closely matched to that of the other carriage and its contents. Furthermore, the distribution of the total mass for each carriage and its contents should be balanced with respect to the X axis, insofar as possible. In those embodiments which use a guide rail (FIGS. 6–8) the total mass of each carriage and its contents should be evenly distributed with respect to the guide rail along which the carriages travel.

I claim:

1. A balanced, null-inertia X axis scanning mechanism for an acoustic microscope or other instrument of the kind comprising a transducer and a scanning mechanism for moving the transducer back and forth relative to a specimen along an axis X and for shifting the specimen and transducer relative to each other along a transverse axis Y so that the specimen is scanned in a predetermined X-Y raster, the scanning mechanism comprising:
   a first carriage and a second carriage;
   guide means for guiding the carriages for movement along the X axis;
   a transducer mounted on the first carriage;
   the total mass of the second carriage being equal to the total mass of the transducer and the first carriage, and the distribution of each of those total masses being approximately balanced with respect to the X axis;
   and drive means comprising two elongated linear drive elements located on opposite side of the X axis and each connected to both carriages, for driving the carriages reciprocally along the X axis, with accelerations and velocities which are equal in amplitude but opposite in direction;
   the drive means being approximately symmetrical with respect to the X axis so that driving forces applied to the carriages are effectively balanced about the axis and so that a straight line between the centers of carriage mass and the line of carriage motion both correspond approximately to the X axis.

2. A balanced, null-inertia scanning mechanism according to claim 1 in which each drive element comprises a drive belt, each drive belt having two linear runs parallel to the X axis.

3. A balanced, null-inertia scanning mechanism according to claim 2 in which one run of each drive belt is connected to the first carriage and the other run of each drive belt is connected to the second carriage.

4. A balanced, null-inertia scanning mechanism according to claim 1, and further comprising an elongated, rigid guide rail extending parallel to the X axis, in which the first and second carriages are mounted adjacent to each other on the guide rail for reciprocal movement therealong, and in which each carriage is of substantially C-shaped configuration, with two legs of the carriage extending across and engaging opposed sides of the guide rail.

5. A balanced, null-inertia scanning mechanism according to claim 1 in which the second carriage is disposed in encompassing relation to the first carriage.

6. A balanced, null-inertia scanning mechanism according to claim 5 in which each drive element comprises a drive belt, each drive belt having two linear runs parallel to the X axis, and in which one run of each drive belt is connected to the first carriage and the other run of each drive belt is connected to the second carriage.

7. A balanced, null-inertia scanning mechanism according to claim 1 in which:
   the second carriage includes two second carriage drive surfaces each spaced from one of two similar first carriage drive surfaces, all of the drive surfaces being parallel to the X axis and the first carriage drive surfaces being on opposite sides of the first carriage;
   the first drive element rotates a first rotary drive member having a drive surface engaging one of the drive surfaces on each carriage;
   and the second drive element rotates a second rotary drive member having a drive surface engaging the other drive surface on each carriage.

8. A balanced, null-inertia scanning mechanism according to claim 7 in which the second carriage is disposed in encompassing relation to the first carriage.

9. A balanced, null-inertia scanning mechanism according to claim 8 in which each drive element comprises a drive belt, each drive belt having two linear runs parallel to the X axis.

10. A balanced, null-inertia scanning mechanism according to claim 7 in which there are two first rotary drive members displaced from each other by a predetermined distance in a direction parallel to the X axis on one side of the first carriage, both rotated by the first drive element, and two second rotary drive members displaced from each other by a corresponding distance on the opposite side of the first carriage, both rotated by the second drive element.

11. A balanced, null-inertia scanning mechanism according to claim 10 in which each of the drive elements is a drive belt, and in which the first drive belt is connected to a drive motor and the secondary drive belt is connected to a counter rotor, the rotary movements of the drive motor and the counter rotor being approximately equal.

12. A balanced, null-inertia scanning mechanism according to claim 11 in which the second carriage is disposed in encompassing relation to the first carriage.

13. A balanced-inertia X axis scanning mechanism for an acoustic microscope or other instrument of the kind comprising a transducer and a scanning mechanism for moving the transducer back and forth relative to a specimen along an axis X and for shifting the specimen and transducer relative to each other along a transverse axis Y so that the specimen is scanned in a predetermined X-Y raster, the scanning mechanism comprising:
   an elongated, rigid guide rail extending parallel to the axis X;
   first and second carriages, mounted adjacent to each other on the guide rail for reciprocal movement therealong, each carriage being of substantially C-shaped configuration, with two legs of the carriage extending across and engaging opposed sides of the guide rail;

a transducer mounted on the first carriage;

the total mass of the second carriage being equal to the total mass of the transducer and the first carriage, and the distribution of each of those total masses being balanced with respect to the X axis;

and drive means, connected to both carriages and substantially symmetrical with respect to the X axis, for driving the carriages reciprocally along the axis X, with accelerations and velocities which are equal in amplitude but opposite in direction.

14. A balanced-inertia scanning mechanism according to claim 13 in which each of the aforesaid opposed sides of the guide rail includes an elongated guide slot parallel to the X axis and in which each carriage leg includes an inwardly projecting bearing and guide element projecting into and engaged in one of those guide slots.

15. A balanced-inertia scanning mechanism according to claim 13 in which the drive means comprises at least one endless drive belt having two linear runs parallel to the X axis, one run connected to the first carriage and the other run connected to the second carriage.

16. A balanced-inertia scanning mechanism according to claim 13 in which the drive means includes first and second parallel spaced endless drive belts, each drive belt having two linear runs parallel to the X axis with one run connected to the first carriage and the other run connected to the second carriage, the first drive belt being connected to the carriages on one side of the guide rail and the second drive belt being connected to the carriages on the other side of the guide rail.

17. A balanced-inertia scanning mechanism according to claim 13, and further comprising:

two end stop plates, mounted at the ends of the guide rail, defining the limits of outward movement of the carriages along the guide rail; and a center stop plate, at the middle of the guide rail, defining the limits of movement of the carriages toward each other along the guide rail.

18. A balanced-inertia scanning mechanism according to claim 17 in which each stop plate includes a plurality of resilient stop elements projecting toward the nearest other stop plate to cushion interruption of any overextended movement of either carriage.

* * * * *